United States Patent [19]

Bedrosian et al.

[11] 4,423,080

[45] * Dec. 27, 1983

[54] CONTROLLED ATMOSPHERE PRODUCE PACKAGE

[75] Inventors: Karakian Bedrosian, Alpine, N.J.; Robert F. Schiffmann, New York, N.Y.

[73] Assignee: Bedrosian and Associates, Alpine, N.J.

[*] Notice: The portion of the term of this patent subsequent to Mar. 14, 1995, has been disclaimed.

[21] Appl. No.: 883,392

[22] Filed: Mar. 6, 1978

Related U.S. Application Data

[63] Continuation-in-part of Ser. No. 749,063, Dec. 9, 1976, Pat. No. 4,079,152, which is a continuation of Ser. No. 556,630, Mar. 10, 1975, abandoned.

[51] Int. Cl.³ .............................................. B65B 25/04
[52] U.S. Cl. ................................... 426/124; 426/118; 426/415; 426/419
[58] Field of Search ............... 426/415, 419, 118, 395, 426/410, 124, 398, 106, 324, 323, 326, 316; 206/204, 205; 229/DIG. 14

[56] References Cited

U.S. PATENT DOCUMENTS

| | | | |
|---|---|---|---|
| 2,524,162 | 10/1950 | Chavannes et al. | 426/124 X |
| 2,548,780 | 4/1951 | Gary et al. | 206/204 |
| 2,838,403 | 6/1958 | Notter | 426/398 |
| 3,102,777 | 9/1963 | Bedrosian et al. | 426/419 |
| 3,399,822 | 9/1968 | Kugler | 426/410 X |
| 3,450,542 | 6/1969 | Badran et al. | 426/316 |
| 3,450,543 | 6/1969 | Badran et al. | 426/415 |
| 3,450,544 | 6/1969 | Badran et al. | 426/415 |
| 3,507,667 | 4/1970 | Magnen | 426/419 |
| 3,630,759 | 12/1971 | Rumberger | 426/415 X |
| 3,761,289 | 9/1973 | Wolf | 426/118 |
| 3,795,749 | 3/1974 | Cummin et al. | 426/415 X |
| 3,804,961 | 4/1974 | Cummin et al. | 426/415 |
| 4,079,152 | 3/1978 | Bedrosian et al. | 426/124 |

FOREIGN PATENT DOCUMENTS

| | | | |
|---|---|---|---|
| 2020563 | 1/1971 | Fed. Rep. of Germany | 426/323 |
| 49-126773 | 4/1974 | Japan | 426/410 |
| 7410 | of 1911 | United Kingdom | 426/419 |
| 691682 | 5/1953 | United Kingdom | 426/419 |
| 1242412 | 8/1971 | United Kingdom | 426/419 |

*Primary Examiner*—Steven L. Weinstein
*Attorney, Agent, or Firm*—Amster, Rothstein & Engelberg

[57] ABSTRACT

A controlled atmosphere package for retarding the ripening rate of fruits and vegetables is formed from the combination of a sealed enclosure and a packet for the package interior which contains chemical agents capable of absorbing moisture and carbon dioxide from the package environment so as to prevent mold growth or other respiratory injury to the product. Absorption of carbon dioxide and water vapor lowers the pressure inside the package and produces a driving force which allows the entry of sufficient air into the package from the surrounding ambient atmosphere to prevent anaerobic respiration and low oxygen injury to the produce.

8 Claims, No Drawings

CONTROLLED ATMOSPHERE PRODUCE PACKAGE

This application is a continuation-in-part of application Ser. No. 749,063, filed Dec. 9, 1976, now U.S. Pat. No. 4,079,152, which application was a continuation of application Ser. No. 556,630, filed Mar. 10, 1975, and now abandoned.

This invention is directed to a system for retarding the ripening process of produce. More particularly, this invention relates to a controlled atmosphere package for produce.

Maintaining the flavor, texture and eating qualities of produce, from the time of harvest through the time of purchase and actual consumption, has been a problem of longstanding duration. The most common technique for preventing produce from reaching an over-ripe state has been to pick the produce in a relatively unripe state, and retard the ripening process by the use of refrigeration. It is well-known in the art, however, that certain fruits and vegetables, such as tomatoes, are very sensitive to low temperatures and, in fact, are physiologically injured if they are exposed to temperatures below 55° F. The injury manifests itself in a loss of flavor, a breakdown of cellular structure and, in later stages, rotting of the produce.

It is also known in the art that the ripening process of produce can be retarded by controlling the atmosphere surrounding the produce, i.e., by reducing the amount of oxygen and increasing the amount of carbon dioxide in the atmosphere. See, for example, Bedrosian, et al., U.S. Pat. No. 3,102,777. Moreover, it has been suggested that the ripening process of fruits such as tomatoes or bananas can be partially or completely retarded by packaging the fruit in plastic films having preselected permeability rates with respect to oxygen and carbon dioxide. See, Badran, U.S. Pat. No. 3,450,542; and Cummin, et al., U.S. Pat. No. 3,804,961. These techniques have not met with widespread acceptance, at least in part due to injury to the produce as a result of carbon dioxide absorption, moisture accumulation which sometimes leads to mold growth, and anaerobic respiration due to the reduced oxygen levels, and also because they have either completely retarded the ripening process or have required initial evacuation or treatment of the package environment.

It is an object of the present invention to provide a controlled atmosphere package for produce without the drawbacks of the prior art.

It is another object of this invention to provide a controlled atmosphere package for fruits and vegetables, capable of controlling the ripening rate of such produce with or without refrigeration, irrespective of the variety, geographic origin, or state of maturity of the produce at the time of packaging.

Yet another object of the invention is to provide a package for produce which controls the ripening rate of the produce, without the formation of mold growth on the produce or injury to the produce as a result of carbon dioxide absorption, moisture accumulation, or anaerobic respiration.

The above objects of the invention are accomplished by providing a package comprising: (1) a sealed enclosure; (2) a sealed packet within said sealed enclosure containing a chemical agent capable of absorbing water vapor; and (3) a second chemical agent contained within said sealed enclosure which is capable of absorbing carbon dioxide. It has now been discovered that when respiring fruits or vegetables are placed within a package formed of the foregoing elements the ambient atmosphere originally present in the sealed enclosure is converted to an atmosphere which is sufficiently low in oxygen content to retard respiration, thereby limiting the ripening rate of the produce, but which is above the minimum oxygen levels, i.e., 0 to 1.0% $O_2$, which would cause anaerobic respiration, thereby injuring the taste, smell and color of the produce. Moreover, it has been discovered that the chemical agents employed within the package environment not only serve to reduce the moisture and carbon dioxide levels in the package atmosphere to levels which do not favor the formation of mold growth or carbon dioxide injury to the fruit but, unexpectedly, cause a reduction of pressure within the sealed enclosure environment. The sealed enclosure is constructed of means responsive to the reduced pressure in the sealed enclosure for permitting additional air or oxygen to enter the enclosure, thereby assuring that the oxygen level within the package environment is sufficient to prevent anaerobic respiration. In one embodiment, the sealed enclosure may be of a gas tight container including valve means responsive to a reduction in pressure in the package which opens to permit the entry of additional oxygen into the container. In a preferred embodiment, the sealed enclosure is formed of a gas permeable film which permits the continuous addition of oxygen to the enclosure in response to the driving force created by the reduced pressure in the package.

Packages formed in accordance with the invention are capable of limiting the ripening rate of tomatoes, for example, to a one-stage increase in maturation development over a seven-day period at room temperature. In contrast, tomatoes left in the air at room temperature will exhibit a one-stage increase in maturation development each day or two; and tomatoes maintained at the minimum recommended storage temperature of 56° F. in air will exhibit a two-stage increase in maturation development in a seven-day period.

It has been discovered that the use of a permeable film, as suggested in the prior art, allows undesirable amounts of water vapor to accumulate within the package environment, since the respiration of the produce produces water vapor as a product, and the films are not sufficiently permeable to allow its escape. The presence of this water vapor within the sealed package stimulates mold growth, particularly in the stem end area of the fruit. Accordingly, it is an important feature of the present invention to include a desiccant within the package. Any known material suitable of absorbing moisture, such as lithium chloride, ethylene glycol, silica gel, calcium chloride, activated alumina, calcium sulfate, or magnesium perchlorate, may be employed. The use of calcium chloride crystals is preferred.

The desiccant is inserted in the package prior to forming a sealed enclosure in the form of a sealed packet which is constructed of a material which is permeable to water vapor. In a preferred embodiment, the packet is constructed of a film which will also retain any solution formed within the packet, thereby keeping such solution out of contact with the produce contained within the package. Suitable films for this purpose include uncoated cellophane film, a film sold by E. I. du Pont de Nemours & Co. under the trademark "Tyvek," which is a co-extruded film formed from polyethylene and paper, micropore polypropylene or wet strengthened paper. The use of the integral film packet not only serves to remove water vapor from the package environment, thereby creating part of the driving force for the introduction of additional air into the package environment, but offers a further advantage in that the solution of calcium chloride which will form after the calcium chloride has absorbed its weight in water will continue to absorb further amounts of water vapor, thereby reducing the quantity of desiccant which must be employed. The amount of desiccant employed is not critical, provided that an amount sufficient to remain active over the entire storage period is employed. When calcium chloride is employed as a desiccant for produce packaged in accordance with the invention, for example, 1 to 10 grams of calcium chloride per pound of produce, e.g. 5 grams/lb. produce has been found to be sufficient to retard the formation of mold for 14–21 days.

Although low oxygen levels in the range of 2.5 to 5.0%, and high carbon dioxide levels in the range of 5 to 10% are desirable from the standpoint of maximum inhibition of the ripening process of produce, such $CO_2$ levels may physically injure the produce, particularly those varieties, such as tomatoes, having a high degree of sensitivity to carbon dioxide. The use of a carbon dioxide absorbent within the package environment not only serves to eliminate carbon dioxide injury, but also reduces the pressure exerted by $CO_2$ in the package environment, thereby contributing to to the creation of a driving force for the introduction of additional air into the package. The absorbent should be present in an amount which will maintain the $CO_2$ content of the package below the level which would cause injury to the particular type of produce, e.g. 0 to 25% $CO_2$ depending on the sensitivity of the particular produce being packaged. Suitable carbon dioxide absorbents include silica gel, charcoal, lithium chloride and preferably lime. The use of 2 to 20 grams, e.g. 5 grams, of hydrated lime per pound of produce will maintain the desired carbon dioxide level for up to 14 days at room temperature. In a preferred embodiment of the invention, the carbon dioxide absorbent is contained within the sealed desiccant packet so as to avoid any direct contact with the produce.

As previously noted, oxygen concentration must be maintained above the anaerobic respiration level of the packaged produce, which is typically in the 0 to 1.0 vol.% oxygen range, but below a point which will lead to rapid ripening of the produce, e.g., 10 vol.%. In a preferred embodiment, a proper oxygen level within the package is achieved by employing a film for the package which is sufficiently permeable to permit ambient air to pass therethrough at a rate which will maintain an oxygen level of 1.0 to 5.0 vol.% oxygen, preferably .3 to 5 vol.% oxygen within the sealed package environment. The pressure differential maintained across the permeable film by the action of the chemical agents in removing carbon dioxide and water vapor from the package environment permits the use of films having greater thickness or lower permeability than would otherwise be useful, thereby offering greater protection to the produce.

It will be obvious to those persons skilled in the art that the thickness of the film layer or the degree of permeability of a particular film type is not critical so long as the film is of a thickness and type which will achieve the desired permeability characteristics when combined with the chemical agents which create the driving force for oxygen maintenance within the package. The film must also be of sufficient strength to avoid rupture during normal shipping and handling of the package. A preferred film is low density polyethylene having an oxygen permeability rate in the range of 75 to 3000 cc/100 sq.in./day, e.g., 2800 cc/100 sq.in./day. In the case of the preferred low density polyethylene, a film thickness of 1.0 to 7.5 mils has been found suitable. Other films having permeability rates which render them suitable for use in the packages of the invention are polyvinyl chloride and polypropylene.

The ratio between the total surface area of film used to form the package and the weight of produce contained within the package is not critical and may vary widely while still achieving the desired environment within the package. However, as the produce-to-film area ratio is increased, somewhat lower oxygen levels within the package environment will be achieved. Typical ratios when employing a polyethylene film may be in the range of 0.005 to 0.50 pounds of produce per square inch of film.

The form of the package or container constructed from the gas permeable film is not critical. Accordingly, the film may be formed into a bag which can be sealed or tied by any conventional means which serves to isolate the package environment from the ambient environment. Alternatively, the film may be used in the form of a wrap for a tray or container which holds the produce, or may be in the form of windows in an otherwise impermeable framework or container. In one embodiment, the film may be in the form of a large bag which serves to enclose one or more shipping cartons containing the produce.

In another embodiment, the package of the invention may be in the form of a gas tight container, such as a shipping container or the like. Such a container can be constructed from a wide variety of materials, provided only that it is appropriately welded or seamed so as to prevent the passage of gases, such as oxygen, nitrogen or carbon dioxide, into or out of the container. The gas tight container is provided with a valve which operates in response to a reduction in pressure within the gas tight container, thereby permitting additional oxygen to enter the container from time to time as the pressure within the container is reduced by the removal of carbon dioxide and water vapor due to the action of the chemical absorbents. It will be readily apparent to those skilled in the art, that a wide variety of pressure sensing devices and valve constructions can be employed to achieve the desired result. For example, a diaphragm valve may be actuated in response to a pressure transducer located within the gas tight container so as to permit the entry of additional air or oxygen into the container in response to a reduction in pressure in the container of any desired amount, e.g., 5 to 25 millimeters.

Irrespective of the form of the package, no steps need be taken to evacuate or otherwise modify the package environment during the initial packaging of the produce. Modification of the package environment results solely from the equilibrium achieved by the respiration of the produce which converts $O_2$ to $CO_2$ and water vapor, the removal of $CO_2$ and water vapor by the chemical agents, and the limited entry of air from the outside atmosphere either through the permeable film or in a sealed container including means for introducing additional oxygen by the action of the driving force produced by pressure reduction which accompanies the removal of the $CO_2$ and water vapor. As long as the chemical agents remain active, the levels of $CO_2$, $O_2$, and water vapor will be held at levels conducive to extended storage of the contained produce.

The invention will be further understood by reference to the following illustrative examples.

EXAMPLE 1

Two pounds of tomatoes in green, light pink, and light red stages of maturity were packed in polyethylene packages and stored at room temperature. Control tomatoes of the same maturity were stored in air. Color development in the tomatoes occurred as follows:

| | Time (Days) | | | | |
|---|---|---|---|---|---|
| | 1 | 3 | 5 | 7 | 9 |
| green (air) | green | breaking green | turning green | light pink green | light red breaking |
| green (packaged) | | | | | |
| light pink (air) | light pink | light red | firm red | soft ripe | soft ripe |
| light pink (packaged) | light pink | light pink | light pink | pink | pink |
| light red (air) | light red | firm red | soft ripe | soft ripe | soft ripe |
| light red (packaged) | light red | light red | light red | firm red | firm red |

The results of this experiment show that regardless of the initial maturity of the produce, packaging in a controlled atmopshere environment significantly slows down the ripening process over what would have occurred if the produce were left in the air.

EXAMPLE 2

A two pound sample of green, light pink, and light red tomatoes was packaged in polyethylene packages and stored at room temperature. One set of sample had 10 gms $CaCl_2$ desiccant packaged in a $3''\times 4''$ Tyvek pouch, and the controls did not. The results after 10 days were, as follows:

| | % Sample Showing Gray Mold | |
|---|---|---|
| Initial Maturity | with $CaCl_2$ Present | Control |
| green | 0.0 | 35% |
| light pink | 0.0 | 42% |
| light red | 0.0 | 40% |

The results from this experiment clearly show that a desiccant reduces the moisture level in the polyethylene package atmosphere to a level which inhibits mold growth.

EXAMPLE 3

A two pound sample of green, light pink, and light red tomatoes was packaged in polyethylene packages and stored at room temperature. One set of the sample had 20 gms of lime and 10 gms of $CaCl_2$ packaged in $3''\times 4''$ Tyvek pouches, and the controls had only 10 gms $CaCl_2$ in the Tyvek pouches. The results after 10 days of storage were, as follows:

| | % Sample Showing $CO_2$ Injury | |
|---|---|---|
| Initial Maturity | Lime and $CaCl_2$ | $CaCl_2$ |
| green | 0.0 | 65% |
| light pink | 0.0 | 53% |
| light red | 0.0 | 50% |

$CO_2$ injury manifests itself in surface blemishes, brown staining, uneven coloration, increased softening, and increased susceptibility to decay. The $CO_2$ level in the packages with lime and $CaCl_2$ present did not exceed 1.1%, whereas the packages containing $CaCl_2$ only averaged $CO_2$ levels of 4.3 to 7.5%.

EXAMPLE 4

Approximately two pounds of tomatoes were placed in five (5) polyethylene bags of varying thicknesses, along with a Tyvek pouch containing 20 gms. lime and 10 gms. $CaCl_2$.

The pouches were sealed in a manner to allow for $CO_2$ and $O_2$ analyses of the atmosphere surrounding the tomatoes. The results are tabulated below.

| | 1.5 mil | | 4.0 mil | | 5.0 mil | | 6.0 mil | | 7.0 mil | |
|---|---|---|---|---|---|---|---|---|---|---|
| Time | % $CO_2$ | % $O_2$ | % $CO_2$ | % $O_2$ | % $CO_2$ | % $O_2$ | % $CO_2$ | % $O_2$ | % $CO_2$ | % $O_2$ |
| 6 hrs. | 0.2 | 12.8 | 0.0 | 11.7 | 0.1 | 12.9 | 0.3 | 14.8 | 0.4 | 13.0 |
| 12 hrs. | 0.1 | 7.5 | 0.2 | 7.9 | 0.3 | 7.3 | 0.2 | 8.2 | 0.3 | 7.6 |
| 18 hrs. | 0.0 | 6.0 | 0.1 | 6.3 | 0.0 | 6.5 | 0.0 | 5.5 | 0.2 | 5.9 |
| 24 hrs. | 0.1 | 4.4 | 0.1 | 4.0 | 0.2 | 3.9 | 0.1 | 4.7 | 0.2 | 4.5 |
| 48 hrs. | 0.1 | 3.5 | 0.3 | 3.0 | 0.1 | 3.1 | 0.3 | 3.4 | 0.1 | 3.9 |
| 72 hrs. | 0.2 | 3.0 | 0.1 | 3.1 | 0.0 | 3.3 | 0.2 | 3.2 | 0.0 | 3.3 |
| 96 hrs. | 0.0 | 3.5 | 0.0 | 3.1 | 0.1 | 3.4 | 0.0 | 3.3 | 0.1 | 3.5 |

All of the bags, ranging in thickness from 1.5 mil to 7.0 mil, reached the same equilibrium condition of 0.0 to 0.2% $CO_2$ and 3.0 to 3.5% $O_2$ at the same time. This example demonstrates that as long as the film surrounding the fruit is permeable to gas flow, the removal of $CO_2$ and $H_2O$ vapor by the absorbents create a driving force for oxygen to permeate the film.

EXAMPLE 5

Bananas in a breaking yellow color condition were separated into four (4) 1000 gm. lots. The fruits were placed in 1.5 mil polyethylene bags. Three of the bags also contained Tyvek pouches containing varying amounts of lime and $CaCl_2$. One bag was a control and contained no lime or $CaCl_2$.

The bags were sealed in a manner so as to allow for $CO_2$ and $O_2$ analyses of the atmosphere surrounding the bananas. The results are tabulated below.

|  | Control (No lime, No CaCl₂) | | #1 (20 gm. lime 10 gm. CaCl₂) | | #2 (40 gm. lime 20 gm. CaCl₂) | | #3 (60 gm. lime 30 gm. CaCl₂) | |
|---|---|---|---|---|---|---|---|---|
| Time | % CO₂ | % O₂ | % CO₂ | % O₂ | % CO₂ | % O₂ | % CO₂ | O₂ |
| 12 hrs. | 27.8 | 0.9 | 0.8 | 1.6 | 0.0 | 1.6 | 0.0 | 1.6 |
| 18 hrs. | 33.2 | 0.8 | 0.8 | 1.4 | 0.0 | 1.6 | 0.0 | 1.4 |
| 24 hrs. | 37.0 | 0.8 | 0.2 | 1.4 | 0.0 | 3.3 | 0.0 | 2.8 |
| 2 days | 35.6 | 0.8 | 0.6 | 1.1 | 0.1 | 2.5 | 0.0 | 2.0 |
| 3 days | 34.8 | 1.0 | 1.8 | 0.8 | 0.4 | 1.1 | 0.2 | 1.6 |
| 4 days | 30.8 | 0.8 | 5.2 | 0.2 | 0.6 | 1.2 | 0.0 | 1.2 |
| 5 days | 28.2 | 0.6 | 7.6 | 0.8 | 1.2 | 0.2 | 0.2 | 1.2 |
| 6 days | 26.4 | 0.8 | 11.2 | 0.8 | 1.4 | 0.6 | 0.4 | 1.2 |
| 7 days | 23.0 | 0.8 | 14.6 | 0.8 | 1.4 | 0.6 | 0.4 | 1.4 |
| 8 days | 21.3 | 0.8 | 16.0 | 0.8 | 2.2 | 0.6 | 0.6 | 1.0 |
| 9 days | 19.1 | 0.8 | 17.0 | 0.8 | 2.6 | 0.6 | 1.2 | 0.8 |

This experiment demonstrates there is a definite relationship between the presence of the chemical absorbents in the package and the maintenance of oxygen levels above the anaerobic respiration level, i.e., above 1 vol.% oxygen.

EXAMPLE 6

Approximately two pounds each of a variety of fruits and vegetables were placed in a 1.5 mil polyethylene bag, along with a Tyvek pouch containing 20 gms lime and 10 gms CaCl₂.

The fruits and vegetables were stored at room temperature and controls were held in air at the same temperature to determine if the package of the invention would extend shelf life. The results are tabulated below.

| | Days of High Quality Shelf Life | |
|---|---|---|
| | Air | Package |
| Apples | 7 | 14 |
| Bananas | 3 | 7 |
| Plums | 3 | 8 |
| Nectarines | 5 | 9 |
| Grapes | 3 | 7 |
| Pears | 8 | 14 |
| Avocadoes | 3 | 7 |
| Cucumbers | 3 | 6 |
| Peppers | 3 | 8 |
| Eggplant | 5 | 10 |
| Summer Squash | 4 | 9 |

All of the fruits and vegetables studied were maintained in a high quality condition for a longer period of time by storage in the "package of the invention" than by storage in air.

What is claimed is:

1. A package for the storage of produce comprising a sealed enclosure containing a quantity of produce, said produce being of any stage of maturity, a sealed packet within said sealed enclosure, a desiccant material within said sealed packet, a carbon dioxide absorbent within said sealed enclosure, said sealed packet being formed from a film which is permeable to water vapor, but which will retain any solution formed in said packet, said desiccant material being present in an amount sufficient to retard the formation of mold on the produce and to reduce the pressure within said sealed enclosure by the removal of water vapor from the atmosphere within said sealed enclosure for the desired period of storage, said carbon dioxide absorbent being present in a quantity sufficient to maintain the carbon dioxide content of the atmosphere within said sealed enclosure below the level which would cause carbon dioxide injury to the produce, and to reduce the pressure within said sealed enclosure by the removal of carbon dioxide from the atmosphere within said sealed enclosure for the desired period of storage, said sealed enclosure being constructed from a gas permeable film which permits additional oxygen to enter the enclosure in response to the reduced pressure created by said desiccant material and said carbon dioxide absorbent, the amount of said additional oxygen being sufficient to maintain the oxygen level of the atmosphere within said sealed enclosure at a level above the anaerobic respiration point of said produce, and below the point at which said produce experiences rapid ripening, the initial atmosphere within said sealed enclosure having been established by sealing the enclosure from the outside ambient atmosphere without modification of the ambient atmosphere within the enclosure, and the resulting atmosphere within said sealed enclosure being established and maintained by the respiration of the enclosed produce, the removal of carbon dioxide and water vapor from the atmosphere within said sealed enclosure, and the entry of additional oxygen into said sealed enclosure in response to reduced pressure within said sealed enclosure.

2. The package of claim 1, wherein the gas permeable film is low density polyethylene.

3. The package of claim 1, wherein said desiccant is calcium chloride.

4. The package of claim 1, wherein said carbon dioxide absorbent is lime.

5. The package of claim 1, wherein said oxygen level is in the range of 1 to 5 vol.%.

6. The package of claim 1, wherein said carbon dioxide absorbent is contained within said sealed packet.

7. The package of claim 1, wherein said sealed packet is formed from a film which will retain any solution formed within said packet.

8. In a package for the storage of produce which comprises a sealed enclosure containing a quantity of produce which is permitted to respire by consuming oxygen present in the enclosure to form carbon dioxide and water, the improvement which comprises a sealed packet within said sealed enclosure, a desiccant material within said sealed packet, a carbon dioxide absorbent within said sealed enclosure, said sealed packet being formed from a film which is permeable to water vapor but which will retain any solution formed in said packet, said desiccant material being present in an amount sufficient to retard the formation of mold on the produce and to reduce the pressure within said sealed enclosure by the removal of water vapor from the atmosphere within said sealed enclosure for the desired period of storage, said carbon dioxide absorbent being present in a quantity sufficient to maintain the carbon dioxide content of the atmosphere within said sealed enclosure below the level which would cause carbon dioxide injury to the produce and to reduce the pressure within said sealed enclosure by the removal of carbon dioxide from the atmosphere within said sealed enclosure for the desired period of storage, said sealed enclosure being constructed from a gas permeable film which permits oxygen to enter the enclosure in response to the reduced pressure created by said desiccant material and said carbon dioxide absorbent, the amount of said oxygen being sufficient to maintain the oxygen level of the atmosphere within said sealed enclosure at a level above the anaerobic respiration point of said produce and below the point at which said produce experiences rapid ripening, the atmosphere within said sealed enclosure being maintained by the respiration of the enclosed produce, the removal of carbon dioxide and water vapor from the atmosphere within said sealed enclosure, and the entry of oxygen into said sealed enclosure in response to reduced pressure within said sealed enclosure.

* * * * *